(12) United States Patent
Kim et al.

(10) Patent No.: US 12,459,511 B2
(45) Date of Patent: Nov. 4, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventors: Untae Kim, Suwon-si (KR); Deuk Young Jung, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 366 days.

(21) Appl. No.: 18/070,725

(22) Filed: Nov. 29, 2022

(65) Prior Publication Data

US 2023/0174067 A1  Jun. 8, 2023

(30) Foreign Application Priority Data

Dec. 3, 2021 (KR) .......................... 10-2021-0172197

(51) Int. Cl.
*B60W 30/165* (2020.01)
*B60W 60/00* (2020.01)
(Continued)

(52) U.S. Cl.
CPC ...... *B60W 30/165* (2013.01); *B60W 60/0051* (2020.02); *G06T 7/60* (2013.01);
(Continued)

(58) Field of Classification Search
CPC .......... B60W 30/165; B60W 60/0051; B60W 2420/403; B60W 2520/10; B60W 2530/201; B60W 2552/10; B60W 2554/4042; B60W 2554/4046; B60W 2554/804; B60W 2554/404; B60W 2754/20; B60W 2754/30; B60W 30/16; B60W 50/00; B60W 60/001; B60W 60/0011; B60W 40/02; B60W 40/1005;
(Continued)

(56) References Cited

U.S. PATENT DOCUMENTS

2012/0320206 A1* 12/2012 Sim ........................ H04N 5/222
                                              348/148
2020/0184827 A1*  6/2020 Park ...................... G08G 1/0145
(Continued)

OTHER PUBLICATIONS

Fred Browand et al., Fuel Saving Achieved in the Field Test of Two Tandem Trucks, California PATH Research Report; UCB-ITS-PRR-2004-20, Jun. 2004; 29pp.
(Continued)

*Primary Examiner* — Ashley L Redhead, Jr.
(74) *Attorney, Agent, or Firm* — Lempia Summerfield Katz LLC

(57) ABSTRACT

Disclosed is a vehicle including a camera having an external field of view of the vehicle and obtaining image data. The vehicle further includes a controller including a processor configured to process the image data. In particular, the controller is configured to determine a target vehicle from at least one surrounding vehicle by processing the image data, determine a first reference point and a second reference point based on the target vehicle, and control the vehicle to follow the target vehicle based on the first reference point and the second reference point.

19 Claims, 12 Drawing Sheets

(51) Int. Cl.
*G06T 7/60* (2017.01)
*G06V 20/58* (2022.01)

(52) U.S. Cl.
CPC ....... *G06V 20/58* (2022.01); *B60W 2420/403* (2013.01); *B60W 2520/10* (2013.01); *B60W 2530/201* (2020.02); *B60W 2552/10* (2020.02); *B60W 2554/4042* (2020.02); *B60W 2554/4046* (2020.02); *B60W 2554/804* (2020.02); *G06T 2207/20092* (2013.01); *G06T 2207/30241* (2013.01); *G06T 2207/30256* (2013.01); *G06V 2201/08* (2022.01)

(58) Field of Classification Search
CPC ..... B60W 2050/0005; B60W 2530/13; B60W 2530/16; G06T 7/60; G06T 2207/20092; G06T 2207/30241; G06T 2207/30256; G06T 2207/10024; G06T 2207/10028; G06T 2207/30252; G06T 7/73; G06V 20/58; G06V 2201/08; G06V 20/56
See application file for complete search history.

(56) References Cited

U.S. PATENT DOCUMENTS

| | | | |
|---|---|---|---|
| 2020/0396782 A1* | 12/2020 | Russell | H04W 36/322 |
| 2021/0056840 A1* | 2/2021 | Yamazaki | G08G 1/095 |
| 2021/0405155 A1* | 12/2021 | Shand | G01S 7/4814 |
| 2022/0124453 A1* | 4/2022 | Stauff | B60R 25/104 |
| 2022/0410804 A1* | 12/2022 | Raeis Hosseiny | B60R 11/04 |
| 2024/0259142 A1* | 8/2024 | Narula | H04L 1/1896 |

OTHER PUBLICATIONS

Riccardo M. Pagliarella et al., Aerodynamic Performance of Vehicles in Platoons: The Influence of Backlight Angles, SAE Technical Paper Series 2007-01-1547, Apr. 2007; pp. 14.

Riccardo M. Pagliarella et al., The Effect of Rear Slant Angle on Vehicle Wakes and Implications for Platoons, SAE TechnicalbrPaper Series 2006-01-0341, Apr. 2006; 12pp.

* cited by examiner

VEHICLE AND METHOD OF CONTROLLING THE SAME

CROSS-REFERENCE TO RELATED APPLICATION(S)

This application claims the benefit of and priority to Korean Patent Application No. 10-2021-0172197, filed on Dec. 3, 2021, the entire content of which are hereby incorporated herein by reference.

TECHNICAL FIELD

The present disclosure relates to a vehicle and a method of controlling the same, and more particularly, to a vehicle for improving fuel efficiency (or energy efficiency) by reducing air resistance received by the vehicle and to a method of controlling the same.

BACKGROUND

The statements in this section merely provide background information related to the present disclosure and may not constitute prior art.

In general, energy consumption efficiency (fuel efficiency or energy efficiency) is an important factor in electric vehicles using a motor as well as vehicles having an internal combustion engine. Even if vehicles have a certain amount of energy, a drivable distance of the vehicles may vary depending on a driving pattern and an external environment. One example of the external environment is air resistance.

According to aerodynamics, when a vehicle follows a location close to the rear of a preceding vehicle, the energy efficiency of the vehicle may be improved because the vehicle receives relatively small air resistance.

However, in the case of a low-speed driving, a difference in air resistance actually received is insignificant, and in the case of a high-speed driving, a risk due to not securing a safe distance occurs.

SUMMARY

The disclosure provides a vehicle equipped with an autonomous driving function capable of minimizing air resistance received by the vehicle and a method for controlling the same.

Additional aspects of the present disclosure are set forth in part in the following description and should be apparent from the description. Alternatively, additional aspects of the disclosure may be learned by practice of the present disclosure.

In accordance with an aspect of the present disclosure, a vehicle includes a camera that is installed in the vehicle and has an external field of view of the vehicle and obtaining image data; and a controller including a processor configured to process the image data. The controller is configured to determine a target vehicle from at least one surrounding vehicle by processing the image data, determine a first reference point and a second reference point based on the target vehicle, and control the vehicle to follow the target vehicle based on the first reference point and the second reference point.

The controller may be further configured to control the vehicle to follow the target vehicle between the first reference point and the second reference point in a lane adjacent to a lane on which the target vehicle is traveling.

The controller may be further configured to determine a front side or a front wheel of the target vehicle as the first reference point and determine a rear side or a rear wheel of the target vehicle as the second reference point.

The controller may be further configured to, when a plurality of surrounding vehicles is detected, obtain overall heights of the plurality of surrounding vehicles and determine a surrounding vehicle with the highest overall height among the plurality of surrounding vehicles as the target vehicle.

The controller may be further configured to, when a plurality of surrounding vehicles is detected, obtain overall lengths of the plurality of surrounding vehicles and determine a surrounding vehicle with the shortest overall length among the plurality of surrounding vehicles as the target vehicle.

The controller may be further configured to, when a plurality of surrounding vehicles is detected, obtain overall lengths and overall heights of the plurality of surrounding vehicles and determine a surrounding vehicle with the largest difference between the overall height and the overall length among the plurality of surrounding vehicles as the target vehicle.

The controller may be further configured to, when a plurality of surrounding vehicles is detected, compare an average speed of each of the plurality of surrounding vehicles with a set speed of the vehicle. The controller may be further configured to, as a result of the comparison, determine the target vehicle among the plurality of surrounding vehicles in which a difference between the average speed and the set speed is less than or equal to a predetermined speed difference.

The controller may be further configured to, when a plurality of surrounding vehicles is detected, obtain an acceleration/deceleration frequency of each of the plurality of surrounding vehicles and determine a surrounding vehicle with the smallest acceleration/deceleration frequency as the target vehicle.

The controller may be further configured to, when a plurality of surrounding vehicles is detected, obtain an acceleration/deceleration magnitude of each of the plurality of surrounding vehicles and determine a surrounding vehicle with the smallest acceleration/deceleration magnitude as the target vehicle.

The controller may be further configured to determine the target vehicle from the at least one surrounding vehicle in response to a user input signal for an autonomous driving mode.

In accordance with another aspect of the disclosure, a method of controlling a vehicle includes obtaining image data; determining a target vehicle from at least one surrounding vehicle by processing the image data; determining a first reference point and a second reference point based on the target vehicle; and controlling the vehicle to follow the target vehicle based on the first reference point and the second reference point.

The controlling the vehicle may further include controlling the vehicle to follow the target vehicle between the first reference point and the second reference point in a lane adjacent to a lane on which the target vehicle is traveling.

The controlling the vehicle may further include determining a front side or a front wheel of the target vehicle as the first reference point and determining a rear side or a rear wheel of the target vehicle as the second reference point.

The method may further include, when a plurality of surrounding vehicles is detected, obtaining overall heights of the plurality of surrounding vehicles and determining a surrounding vehicle with the highest overall height among the plurality of surrounding vehicles as the target vehicle.

The method may further include, when a plurality of surrounding vehicles is detected, obtaining overall lengths of the plurality of surrounding vehicles and determining a surrounding vehicle with the shortest overall length among the plurality of surrounding vehicles as the target vehicle.

The method may further include, when a plurality of surrounding vehicles is detected, obtaining overall lengths and overall heights of the plurality of surrounding vehicles and determining a surrounding vehicle with the largest difference between the overall height and the overall length among the plurality of surrounding vehicles as the target vehicle.

The method may further include, when a plurality of surrounding vehicles is detected, comparing an average speed of each of the plurality of surrounding vehicles with a set speed of the vehicle and, as a result of the comparison, determining the target vehicle among the plurality of surrounding vehicles in which a difference between the average speed and the set speed is less than or equal to a predetermined speed difference.

The method may further include, when a plurality of surrounding vehicles is detected, obtaining an acceleration/deceleration frequency of each of the plurality of surrounding vehicles and determining a surrounding vehicle with the smallest acceleration/deceleration frequency as the target vehicle.

The method may further include, when a plurality of surrounding vehicles is detected, obtaining an acceleration/deceleration magnitude of each of the plurality of surrounding vehicles and determining a surrounding vehicle with the smallest acceleration/deceleration magnitude as the target vehicle.

The method may further include determining the target vehicle from the at least one surrounding vehicle in response to a user input signal for an autonomous driving mode.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
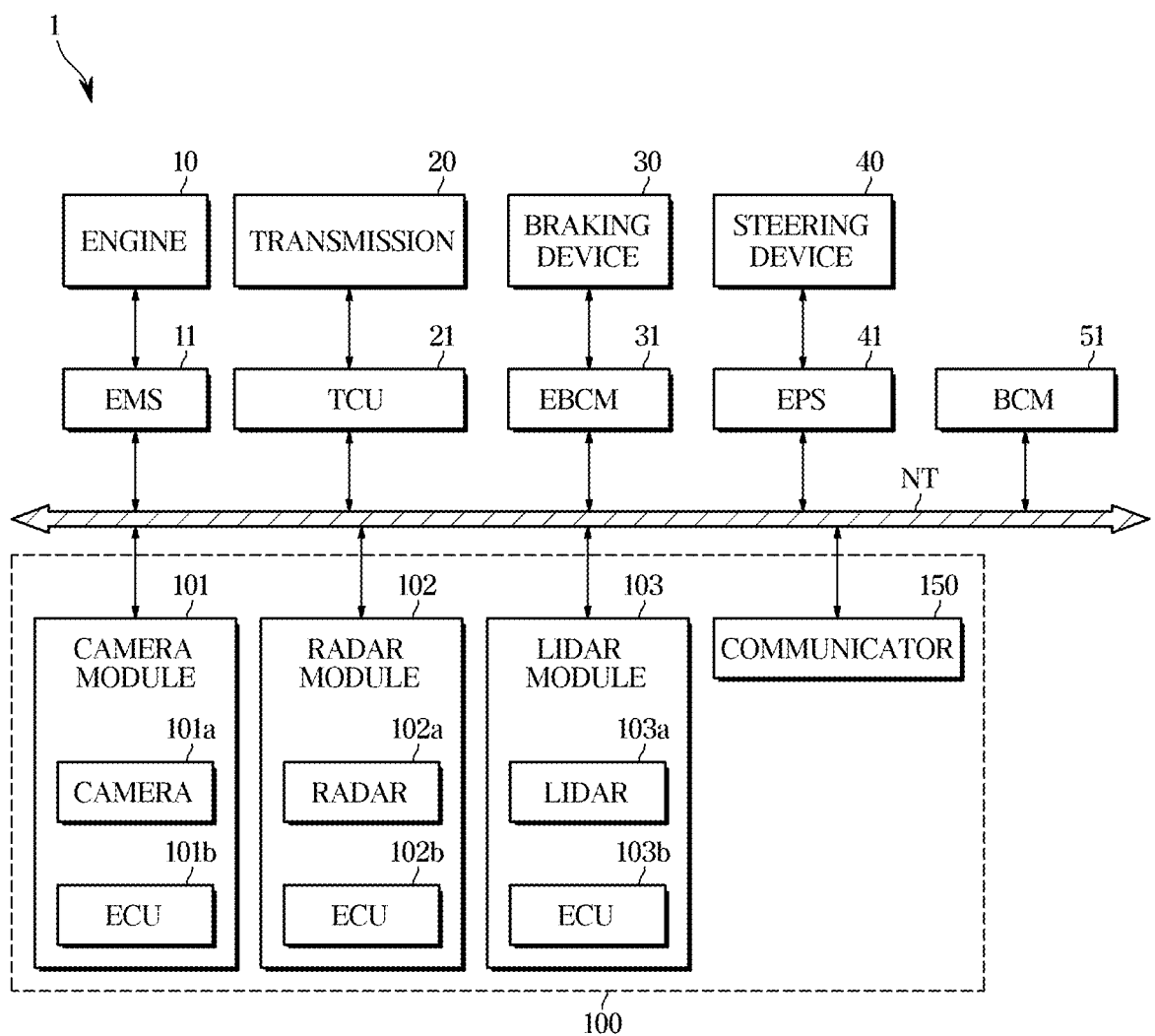
FIG. 1 shows a configuration of a vehicle according to an embodiment of the disclosure.

References are now made in detail to the embodiments of the disclosure, examples of which are illustrated in the accompanying drawings. Like reference numerals refer to like elements throughout. This specification does not describe all elements of the disclosed embodiments and detailed descriptions well known in the art or redundant descriptions of substantially the same configurations have been omitted. The terms 'part', 'module', 'member', 'block', and the like as used in the specification may be implemented in software or hardware. Further, a plurality of 'part', 'module', 'member', 'block', and the like may be embodied as one component. It is also possible that one 'part', 'module', 'member', 'block', and the like includes a plurality of components. When a 'part', 'module', 'member', 'block', or the like of the present disclosure is described as having a purpose or performing an operation, function, or the like, the 'part', 'module', 'member', 'block', or the like should be considered herein as being "configured to" meet that purpose or to perform that operation or function.

Throughout the specification, when an element is referred to as being "connected to" another element, it may be directly or indirectly connected to the other element, and the "indirectly connected to" includes being connected to the other element via a wireless communication network.

Also, it should be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations, and the operations may be performed in a different order unless otherwise stated.

Hereinafter, embodiments of the disclosure are described in detail with reference to the accompanying drawings.

Figure 2:
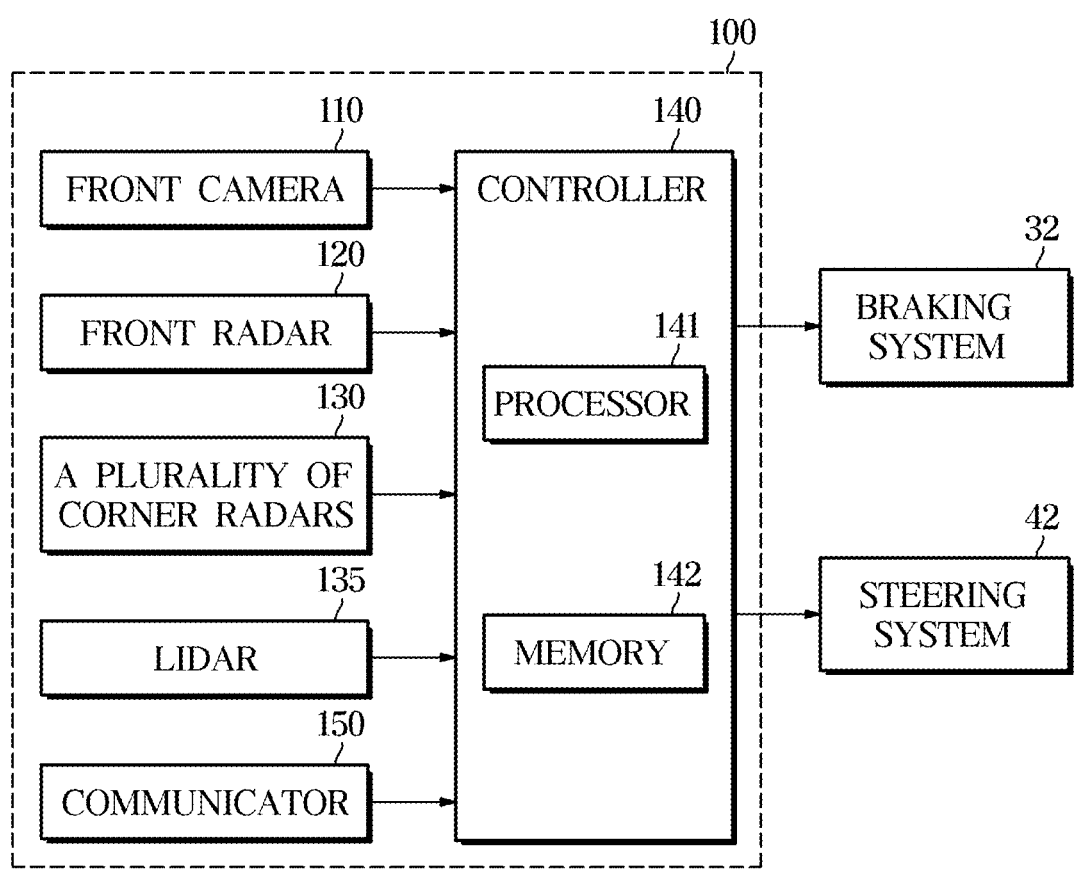
FIG. 2 shows a control block diagram of a vehicle according to an embodiment of the disclosure.
Figure 3:
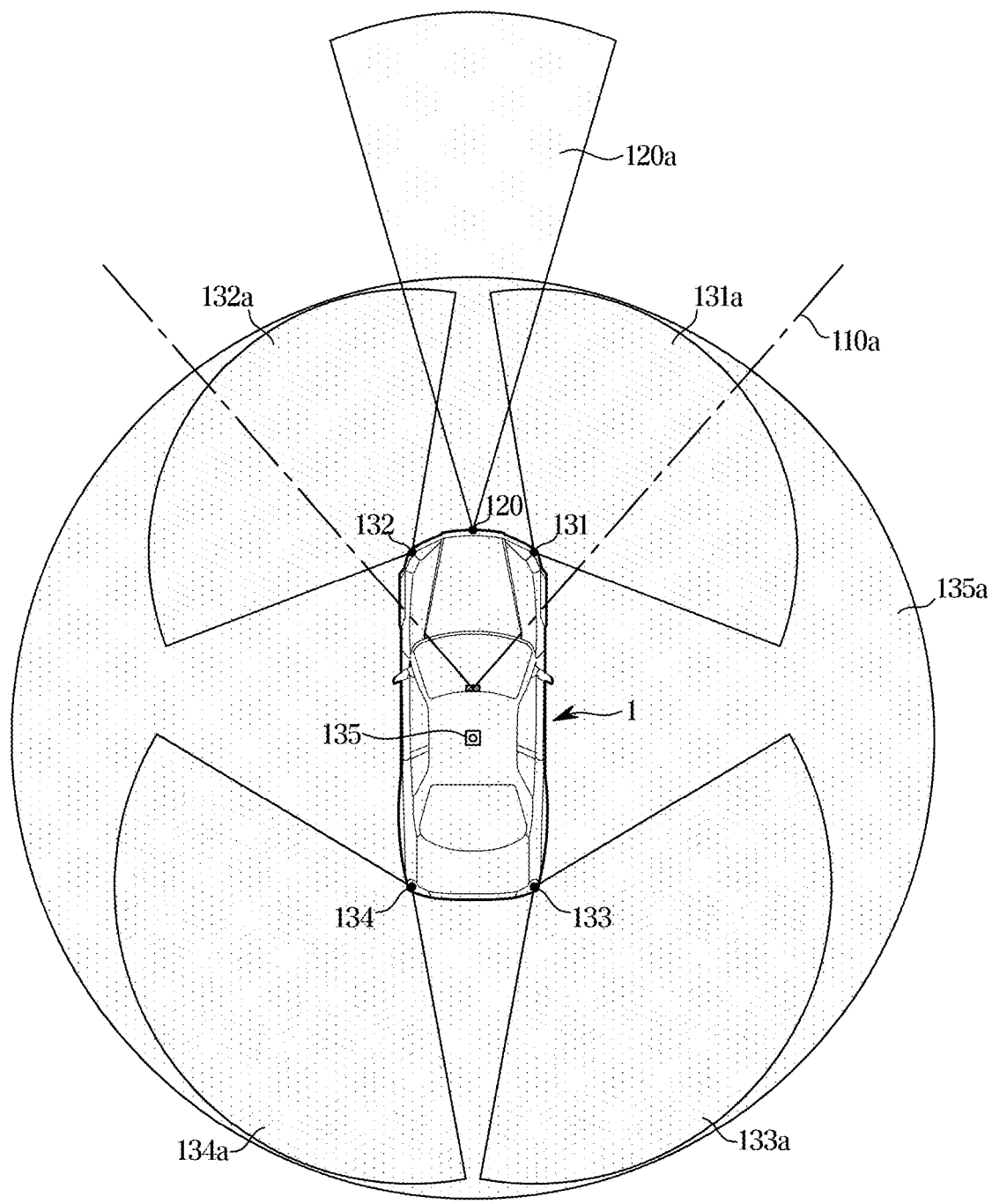
FIG. 3 shows a camera and a radar included in a vehicle according to an embodiment of the disclosure.

FIG. 1 shows a configuration of a vehicle according to an embodiment, FIG. 2 shows a control block diagram of a vehicle according to an embodiment, and FIG. 3 shows a camera and a radar included in a vehicle according to an embodiment of the disclosure.

As shown in FIG. 1, a vehicle 1 includes an engine 10, a transmission 20, a braking device 30, and a steering device 40. The engine 10 may include a cylinder and a piston and generate power for driving the vehicle 1. The transmission 20 may include a plurality of gears and transmit the power generated by the engine 10 to wheels. The braking device 30 may decelerate the vehicle 1 or stop the vehicle 1 through friction with the wheels. The steering device 40 may change a driving direction of the vehicle 1.

Embodiments of the disclosure may be applied not only to a vehicle that is an internal combustion engine in which the above-described power is obtained from the engine 10, but also to electric vehicle (EV) or hybrid vehicle (HEV) equipped with an autonomous driving function.

The vehicle 1 may include a plurality of electrical components. For example, the vehicle 1 may include an Engine Management System (EMS) 11, a Transmission Control Unit (TCU) 21, an Electronic Brake Control Module (EBCM) 31, an Electronic Power Steering (EPS) 41, a body control module (BCM) 51, and an autonomous driving system 100.

The EMS 11 may control the engine 10 in response to a driver's intention to accelerate through an accelerator pedal or a request from the autonomous driving system 100. For example, the EMS 11 may control a torque of the engine 10.

The TCU 21 may control the transmission 20 in response to a driver's shift instruction using a shift lever and/or a driving speed of the vehicle 1. For example, the TCU 21 may adjust a shift ratio from the engine 10 to the wheels.

The EBCM 31 may control the braking device 30 in response to a driver's intention to brake through a brake pedal and/or a slip of the wheels. For example, the EBCM 31 may temporarily release braking of the wheels in response to the slip of the wheels detected when the vehicle 1 is braked (e.g., Anti-lock Braking Systems (ABS)). The EBCM 31 may selectively release braking of the wheels in response to oversteering and/or understeering detected when the vehicle 1 is steered (e.g., Electronic stability control (ESC)). Furthermore, the EBCM 31 may temporarily release braking of the wheels in response to the slip of the wheels detected when the vehicle 1 is driven (e.g., Traction Control System (TCS)).

The EPS 41 may assist operation of the steering device 40 so that a driver may easily manipulate a steering wheel in response to a driver's intention to steer through the steering wheel. For example, the EPS 41 may assist the operation of the steering device 40 to decrease steering force during a low-speed driving or parking and increase steering force during a high-speed driving.

The BCM 51 may control operation of electrical components that provide convenience to a driver or ensure a driver's safety. For example, the BCM 51 may control a head lamp, a wiper, a cluster, a multi-function switch, a direction indicator lamp, and the like.

The autonomous driving system 100 may assist a driver to operate (driving, braking, and steering) the vehicle 1. For example, the autonomous driving system 100 may detect an environment of a road on which the vehicle 1 is traveling (e.g., other vehicles, pedestrians, cyclists, lanes, road signs, traffic lights, etc.) and may control the driving and/or braking and/or steering of the vehicle 1 in response to the detected environment.

As another example, the autonomous driving system 100 may receive a high-precision map at a current location of the vehicle from an external server and control the driving and/or braking and/or steering of the vehicle 1 in response to the received high-precision map.

The autonomous driving system 100 may provide various functions to a driver. For example, the autonomous driving system 100 may provide Lane Departure Warning (LDW), Lane Keeping Assist (LKA), High Beam Assist (HBA), Autonomous Emergency Braking (AEB), Traffic Sign Recognition (TSR), Smart Cruise Control (SCC), Blind Spot Detection (BSD), and an Inertial Driving Guidance, and the like.

The autonomous driving system 100 may include a camera module 101 that obtains image data around the vehicle 1, a radar module 102 that obtains object data around the vehicle 1, and a light detection and ranging (lidar) module 103 that scans surroundings of the vehicles and detects an object. The camera module 101 may include a camera 101*a* and an Electronic Control Unit (ECU) 101*b* and may photograph the front of the vehicle 1 and identify other vehicles, pedestrians, cyclists, lanes, road signs, structures, etc. The radar module 102 may include a radar 102*a* and an ECU 102*b* and obtain a relative position, a relative speed, etc. of an object (e.g., other vehicles, pedestrians, cyclists, structures, etc.) around the vehicle 1.

The lidar module 103 may include a lidar 103*a* and an ECU 103*b* and obtain a relative position, a relative speed, etc. of a moving object (e.g., other vehicles, pedestrians, cyclists, etc.) around the vehicle 1. Furthermore, the lidar module 103 may obtain a shape and a location of a nearby stationary object (e.g., a building, a sign, a traffic light, a bump, etc.).

More specifically, the lidar module 103 may obtain the shape and position of the stationary object around the vehicle 1 by obtaining point cloud data for an external view of the vehicle 1.

In other words, the autonomous driving system 100 may process image data acquired from the camera module 101, detection data acquired from the radar module 102, and point cloud data acquired from the lidar module 103. The autonomous driving system 100 may, in response to processing the image data, the detection data, and the point cloud data, detect the environment of the road on which the vehicle 1 is traveling, a front object located in front of the vehicle 1, a lateral object located on the side of the vehicle 1, a rear object located behind the vehicle 1.

The autonomous driving system 100 is not limited to that shown in FIG. 1, and the lidar module 103 may be replaced with the radar module 102 or used together. The autonomous driving system 100 may include a communicator 150 that receives the high-precision map at the current location of the vehicle from a cloud server.

The communicator 150 may be implemented using a communication chip, an antenna, and related components so as to access a wireless communication network. In other words, the communicator 150 may be implemented with various types of communication modules capable of a long-distance communication with an external server. In other words, the communicator 150 may include a wireless communication module for wirelessly exchanging data with an external server.

The above electrical components may communicate with each other via a vehicle communication network (NT). For example, electrical components may exchange data through Ethernet, Media Oriented Systems Transport (MOST), Flexray, Controller Area Network (CAN), Local Interconnect Network (LIN), and the like. For example, the autonomous driving system 100 may transmit a driving control signal, a braking signal and a steering to the EMS 11, the EBCM 31, and the EPS 41 through the NT, respectively.

As shown in FIG. 2, the vehicle 1 may include a braking system 32, a steering system 42, and the autonomous driving system 100.

The braking system 32 may include the EBCM 31 (see FIG. 1) and the braking device 30 (see FIG. 1), which are described in FIG. 1. The steering system 42 may include the EPS 41 (see FIG. 1) and the steering device 40 (see FIG. 1).

The braking system 32 and the steering system 42 may control the vehicle 1 so that the vehicle 1 performs the autonomous driving function based on a control signal of the autonomous driving system 100.

The autonomous driving system 100 may include a front camera 110, a front radar 120, a plurality of corner radars 130, a lidar 135, and the communicator 150.

The front camera 110 may have a field of view 110a facing the front of the vehicle 1 as shown in FIG. 3. The front camera 110 may be installed, for example, on a front windshield of the vehicle 1, but may be provided at any position without limitation as long as it has the field of view facing the front of the vehicle 1.

The front camera 110 may photograph the front of the vehicle 1 and obtain image data of the front of the vehicle 1. The image data of the front of the vehicle 1 may include a location with respect to a road boundary positioned in front of the vehicle 1.

The front camera 110 may include a plurality of lenses and image sensors. The image sensors may include a plurality of photodiodes that convert light into an electrical signal, and the plurality of photodiodes may be arranged in a two-dimensional matrix.

The front camera 110 may be electrically connected to a controller 140. For example, the front camera 110 may be connected to the controller 140 through the NT, connected to the controller 140 through a hard wire, or connected to the controller 140 through a printed circuit board (PCB).

The front camera 110 may transmit image data (hereinafter, referred to as front image data) of the front of the vehicle 1 to the controller 140.

The front radar 120 may have a field of sensing 120a facing the front of the vehicle 1 as shown in FIG. 3. The front radar 120 may be installed, for example, on a grille or a bumper of the vehicle 1.

The front radar 120 may include a transmission antenna (or a transmission antenna array) that radiates a transmission wave toward the front of the vehicle 1 and may include a reception antenna (or a reception antenna array) that receives the reflected wave reflected by an object. The front radar 120 may obtain front detection data from the transmission wave transmitted by the transmission antenna and the reflected wave received by the reception antenna. The front detection data may include distance information and a degree of speed regarding other vehicles, pedestrians or cyclists located in front of the vehicle 1. The front radar 120 may calculate a state distance to an object based on a phase difference (or a time difference) between the transmission wave and the reflected wave, and calculate a relative speed of the object based on a frequency difference between the transmission wave and the reflected wave.

The front radar 120 may be connected to the controller 140 through, for example, the NT or the hard wire or the PCB. The front radar 120 may transmit forward detection data (hereinafter, referred to as front detection data) to the controller 140.

The plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a field of sensing 131a facing the front right side of the vehicle 1 as shown in FIG. 3. The front radar may be installed, for example, on the right side of a front bumper of the vehicle 1. The second corner radar 132 may have a field of sensing 132a facing the front left side of the vehicle 1 and may be installed, for example, on the left side of the front bumper of the vehicle 1. The third corner radar 133 may have a field of sensing 133a facing the rear right of the vehicle 1 and may be installed, for example, on the right side of a rear bumper of the vehicle 1. The fourth corner radar 134 may have a field of sensing 134a facing the rear left of the vehicle 1 and may be installed, for example, on the left side of the rear bumper of the vehicle 1.

Each of the first, second, third, and fourth corner radars 131, 132, 133, and 134 may include a transmission antenna and a reception antenna. The first, second, third, and fourth corner radars 131, 132, 133 and 134 may obtain first corner detection data, second corner detection data, third corner detection data, and fourth corner detection data, respectively. The first corner detection data may include distance information and speed degree about other vehicles or pedestrians or cyclists or structures (hereinafter referred to as an object) located on the front right side of the vehicle 1. The second corner detection data may include distance information and speed degree of the object located on the front left side of the vehicle 1. The third and fourth corner detection data may include distance information and relative speed of the objects located on the rear right side of the vehicle 1 and the rear left side of the vehicle 1.

Each of the first, second, third, and fourth corner radars 131, 132, 133, 134 may be connected to the controller 140 through, for example, the NT or the hard wire or the PCB. The first, second, third, and fourth corner radars 131, 132, 133, and 134 may transmit the first, second, third, and fourth corner detection data to the controller 140, respectively.

The lidar 135 may obtain a relative position, relative speed, etc. of a moving object (e.g., any other vehicle, a pedestrian, a cyclist, etc.) in the vicinity of the vehicle 1. Furthermore, the lidar 135 may obtain a shape and a location of a nearby stationary object (e.g., a building, a sign, a traffic light, a bump, etc.). The lidar 135 may be installed in the vehicle 1 to have an external field of view 135a of the vehicle 1 and may obtain point cloud data for the external field of view 135a of the vehicle 1.

For example, the lidar 135 may be provided on the exterior of the vehicle 1 to have the external field of view 135a of the vehicle 1 as shown in FIG. 3 and may in particular be provided on the loop of the vehicle 1.

The lidar 135 may include a light emitting unit for emitting light, a light receiving unit provided to receive light in a predetermined direction among reflected light when the light emitted from the light emitting unit is reflected from an obstacle, and a printed circuit board (PCB) to which the light emitting unit and the light receiving unit are fixed. In this case, the PCB is provided on a support plate rotated by a rotation driving unit, so that the PCB may rotate 360 degrees in a clockwise or counterclockwise direction.

In other words, the support plate may rotate about an axis according to the power transmitted from the rotation driving unit, and the light emitting unit and the light receiving unit are fixed to the PCB and rotates 360 degrees clockwise or counterclockwise along with the rotation of the PCB. Accordingly, the lidar 135 may detect an object in all directions by emitting and receiving light at 360 degrees.

The light emitting unit refers to a component that emits light (e.g., an infrared laser), and the light emitting unit may be provided singly or in plurality according to embodiments.

When the light emitted from the light emitting unit is reflected from the obstacle, the light receiving unit is provided to receive a light in a predetermined direction among the reflected light. An output signal generated by receiving the light by the light receiving unit may be provided to an object detection process of the controller 140.

The light receiving unit may include a condenser lens for condensing the received light and an optical sensor for detecting the received light. According to an embodiment of the disclosure, the light receiving unit may include an amplifier that amplifies the light detected by the optical sensor.

The lidar 135 may receive data on numerous points on external surfaces of the object and may obtain point cloud data, which is a set of data for these points.

The controller 140 may include the ECU 101*b* (see FIG. 1) of the camera module 101 (see FIG. 1) and/or the ECU 102*b* (see FIG. 1) of the radar module 102 (see FIG. 1) and/or the ECU 103*b* (see FIG. 1) of the lidar module 103 (see FIG. 1) and/or a separate integrated ECU.

Hereinafter, for convenience of description, it is assumed that the front detection data obtained from the front radar 120 may be substituted or used together with the point cloud data obtained from the lidar 135. In other words, the front detection data obtained from the front radar 120 may refer to point cloud data for the front of the vehicle 1 obtained from the lidar 135.

The controller 140 may include a processor 141 and a memory 142.

The processor 141 may process the front image data of the front camera 110 and the front detection data of the front radar 120 and generate a braking signal and a steering signal for controlling the braking system 32 and the steering system 42. Furthermore, the processor 141 may calculate a distance between the vehicle 1 and a right road boundary (hereinafter, referred to as a first distance) and calculate a distance between the vehicle 1 and a left road boundary (hereinafter, referred to as a second distance) in response to processing the front image data of the front camera 110 and the front detection data of the front radar 120.

As a method of calculating the first distance and the second distance, a conventional image data processing technique and/or a radar/lidar data processing technique may be used.

The processor 141 may process the front image data of the front camera 110 and the front detection data of the front radar 120 and may, in response to processing the front image data and the front detection data, detect objects (e.g., lanes and structures) in front of the vehicle 1.

More specifically, the processor 141 may obtain the positions (distances and directions) and relative speeds of objects in front of the vehicle 1 based on front detection data obtained by the front radar 120. The processor 141 may obtain positions (directions) and type information (e.g., whether the objects are other vehicles or structures, etc.) of the objects in front of the vehicle 1 based on the front image data of the front camera 110. Furthermore, the processor 141 may match the objects detected by the front image data to the objects detected by the front detection data and obtain type information, positions, and relative speeds of the objects in front of the vehicle 1 based on the matching result.

Furthermore, as described above, the processor 141 may obtain information related to the environment of the road on which the vehicle 1 is traveling and information related to the front object. The processor 141 may calculate the distance between the vehicle 1 and the right road boundary and calculate the distance between the vehicle 1 and the left road boundary.

The road boundaries may refer to a boundary line of a structure such as a guard rail, opposite ends of a tunnel, an artificial wall, etc. through which the vehicle 1 cannot physically pass. The road boundaries may also refer to a center line that the vehicle 1 cannot pass through in principle. However, the present disclosure is not limited thereto.

The processor 141 may process the high-precision map received from the communicator 150 and may, in response to processing the high-precision map, calculate a distance between the vehicle 1 and the right road boundary (hereinafter, referred to as a third distance) and calculate a distance between the vehicle 1 and the left road boundary (hereinafter, referred to as a fourth distance).

More specifically, the processor 141 may receive the high-precision map at the current location of the vehicle 1 based on the current location of the vehicle 1 obtained from Global Positioning System (GPS) and determine the position of the vehicle 1 on the high-precision map based on the front image data and the front detection data.

For example, the processor 141 may determine a road on which the vehicle 1 is traveling at the high-precision map based on location information of the vehicle 1 obtained from GPS and determine a lane on which the vehicle 1 is traveling based on the front image data and the front detection data. In other words, the processor 141 may determine the coordinates of the vehicle on the high-precision map.

For example, the processor 141 may determine the number of left lanes in response to processing the front image data and the front detection data and may, based on the determined number of left lanes, determine the location of the lane on which the vehicle is traveling on the high-precision map. As a result, the processor may specifically determine the coordinates of the vehicle 1 on the high-precision map, but the method of determining the coordinates of the vehicle 1 on the high-precision map is not limited thereto.

In other words, the processor 141 may determine the coordinates of the vehicle 1 on the high-precision map based on the number of right lanes detected based on the front image data and the front detection data and determine the coordinates of the vehicle 1 on the precision map based on the first and second distances calculated based on the front image data and the front detection data.

To this end, the processor 141 may include an image processor that processes the front image data of the front camera 110 and high-precision map data and/or include a digital signal processor that processes detection data of the front radar 120 and/or include a micro control unit (MCU) or a domain control unit (DCU) that generates a control signal for controlling the braking system 32 and the steering system 42.

The memory 142 may store a program and/or data for the processor 141 to process image data such as the front image data and the high-precision map data, store a program and/or data for processing detection data, and store programs and/or data for the processor 141 to generate a braking signal and/or a steering signal.

The memory 142 may temporarily store the image data received from the front camera 110 and/or the detection data received from the radar 120 and store the high-precision map received from the communicator 150. The memory 142 may also temporarily store a result of processing of the image data and detection data of the processor 141.

Furthermore, the memory 142 may store permanently or semi-permanently the image data received from the front camera 110 and/or the detection data received from the radars 120 and 130 and/or the high-precision map received from the communicator 150 according to signals from the processor 141.

The memory 142, for this purpose, may include not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

As described above, the radars 120 and 130 may be replaced with or used together with the lidar 135 that scans the surrounding of the vehicle 1 and detects an object.

Figure 4:
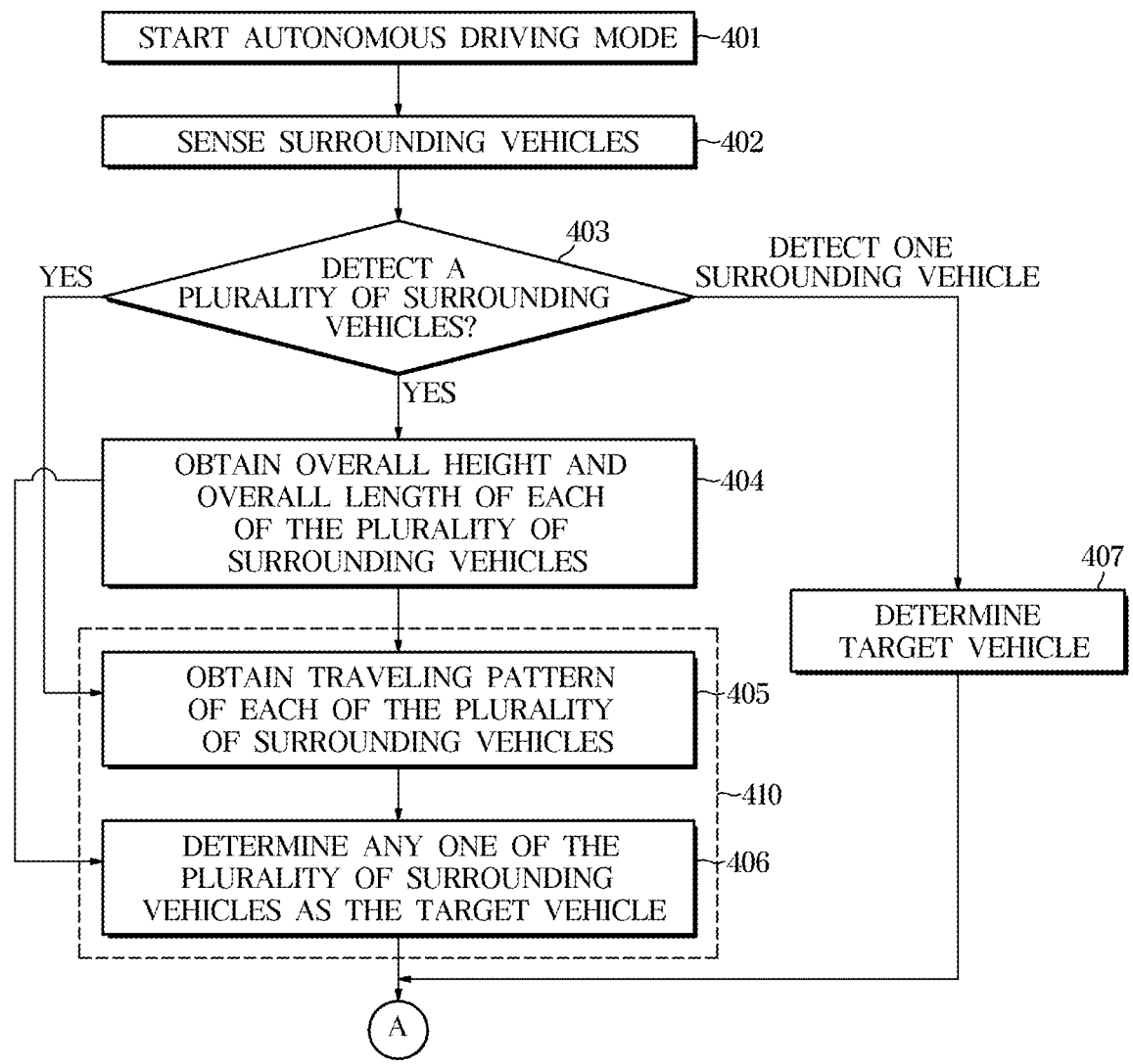
FIG. 4 is a flowchart illustrating a method for controlling a vehicle according to an embodiment of the disclosure.
Figure 5:
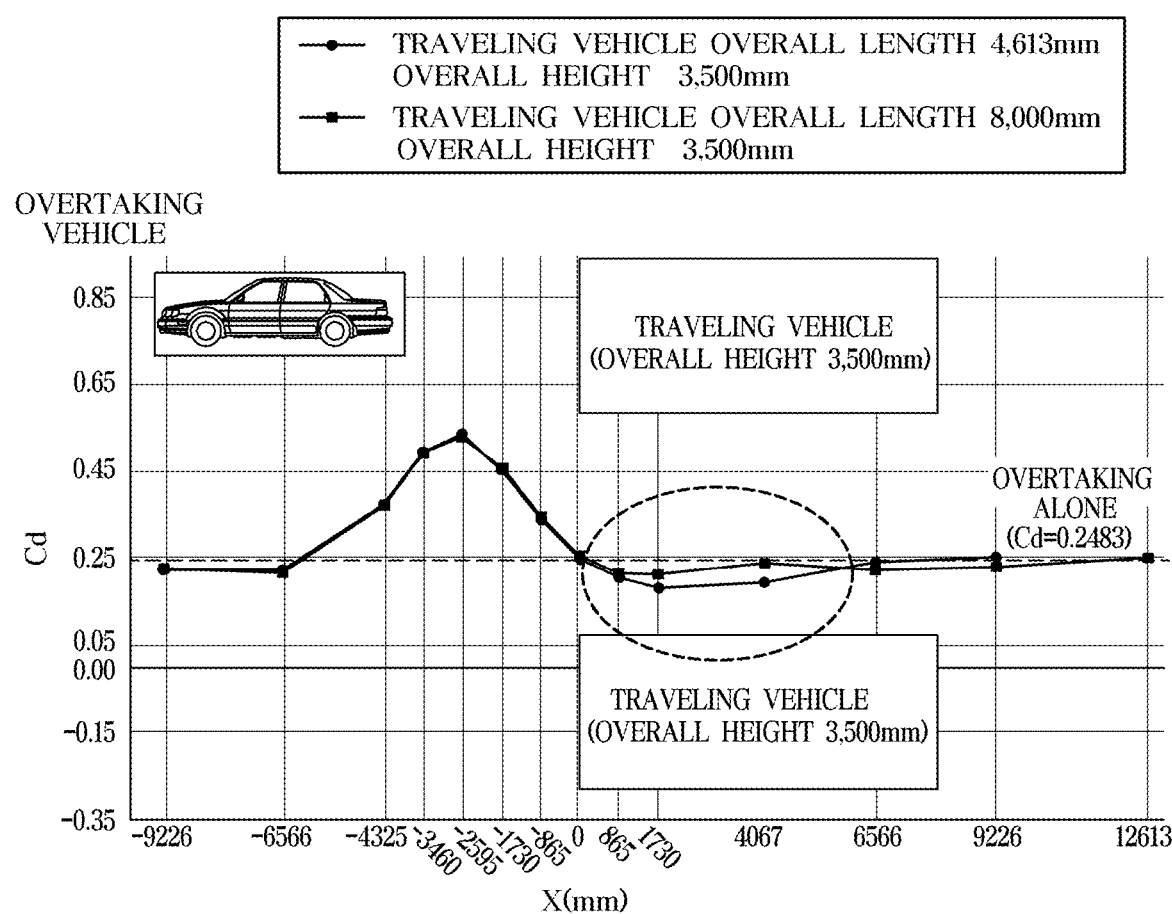
FIG. 5 is a view for explaining a difference in drag force according to an overall length of a target vehicle.
Figure 6:
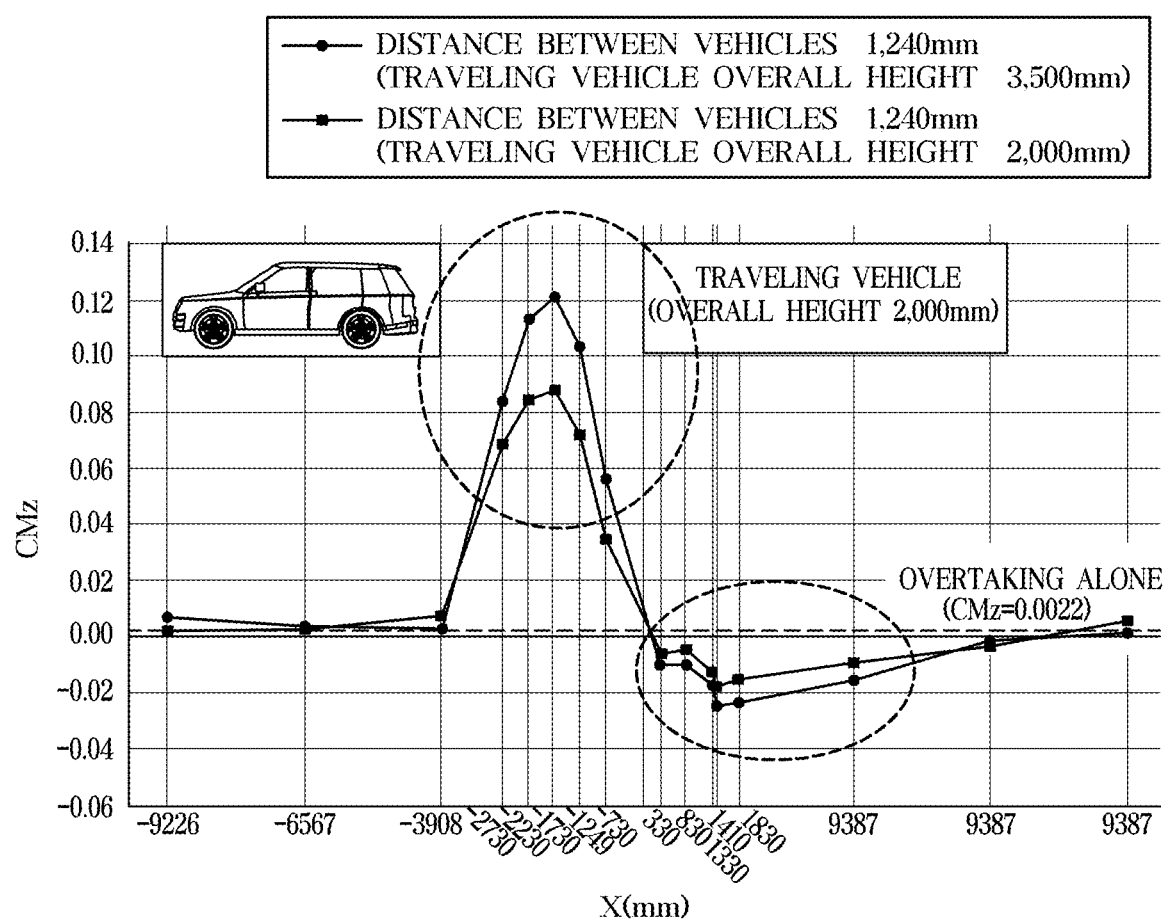
FIG. 6 is a view for explaining a difference in drag force according to an overall height of a target vehicle.

FIG. 4 is a flowchart illustrating a method for controlling a vehicle according to an embodiment of the disclosure. FIG. 5 is a view for explaining a difference in drag force according to an overall length of a target vehicle. FIG. 6 is a view for explaining a difference in drag force according to an overall height of the target vehicle. The description of the embodiment according to FIG. 4 will be described with reference to FIGS. 5 and 6.

An autonomous driving mode is started by a user's input (401). The autonomous driving mode is executed by the user input, and the autonomous driving mode may include an optimum fuel efficiency mode, a shortest time mode, and a combined efficiency mode. Here, the optimum fuel efficiency mode is a setting for driving to a destination with optimal energy consumption efficiency (fuel efficiency or energy efficiency). The shortest time mode is a setting for driving to the destination at the fastest speed possible without considering energy consumption efficiency. The combined efficiency mode is a combination of the optimum fuel efficiency mode and the shortest time mode. Embodiments according to the disclosure may be implemented when the optimum fuel efficiency mode is executed.

The controller 140 according to an embodiment of the disclosure may determine a target vehicle from at least one surrounding vehicles in response to a user input signal for the autonomous driving mode. In this case, the autonomous driving mode input by the user may be the optimum fuel efficiency mode.

In response to that the optimum fuel efficiency mode is started, the controller 140 performs a series of steps to minimize air resistance caused by surrounding vehicles in order to drive according to the optimum energy consumption efficiency.

First, the controller 140 senses surrounding vehicles using cameras and various sensors provided in the vehicle 1 (402).

The controller 140 determines whether a plurality of surrounding vehicles are traveling in the vicinity of the vehicle 1 (403). In response to that only one surrounding vehicle on the road on which the vehicle 1 is traveling, the controller 140 determines the corresponding surrounding vehicle as the target vehicle (407).

Meanwhile, when a plurality of surrounding vehicles are traveling in the vicinity of the vehicle 1 (Yes in 403), the controller 140 performs a series of steps for determining the target vehicle among the plurality of surrounding vehicles.

The controller 140 according to an embodiment obtains the overall height and/or the overall length of each of the plurality of surrounding vehicles (404). According to experimental results, drag force (or drag) received by the vehicle 1 may be changed by the overall height and length of the surrounding vehicles.

Referring to FIG. 5, drag force for each position that an overtaking vehicle receives between two traveling vehicles with the same overall height and different overall length may be identified. As shown in the graph shown in FIG. 5, the traveling vehicle with the overall length of 4,163 mm provides a smaller drag force to the overtaking vehicle than the traveling vehicle with the overall length of 8,000 mm. Accordingly, the vehicle 1 may receive a relatively small drag force when the vehicle is near the traveling vehicle with a short overall length, and the energy consumption efficiency may be improved by minimizing the drag force.

Referring to FIG. 6, drag force for each position that the overtaking vehicle receives between two traveling vehicles with the same overall length and different overall height may be identified. As shown in the graph shown in FIG. 6, the traveling vehicle with the overall height of 3,500 mm provides a smaller drag force to the overtaking vehicle than the traveling vehicle with the overall height of 2,000 mm. Accordingly, the vehicle 1 may receive a relatively small drag force when the vehicle is near the traveling vehicle with a high overall height, and the energy consumption efficiency may be improved by minimizing the drag force.

Combining the results of FIGS. 5 and 6, when the plurality of surrounding vehicles exists around the vehicle 1, the vehicle 1 determines the surrounding vehicle with the highest overall height and the short overall length as the target vehicle and travels near the target vehicle. Thus, energy consumption efficiency may be improved.

The vehicle 1 according to an embodiment of the disclosure may determine any one of the plurality of surrounding vehicles as the target vehicle based on at least one of operations 404 and 405 (406).

For example, when the vehicle 1 detects the plurality of surrounding vehicles, the vehicle 1 may obtain the overall heights of the plurality of surrounding vehicles and determine a surrounding vehicle with the highest overall height among the plurality of surrounding vehicles as the target vehicle. Furthermore, when the vehicle 1 detects the plurality of surrounding vehicles, the vehicle 1 may obtain the overall lengths of the plurality of surrounding vehicles and determine a surrounding vehicle with the shortest overall length among the plurality of surrounding vehicles as the target vehicle. Furthermore, when the surrounding vehicles having the same overall length or height exist, the vehicle 1 may determine a surrounding vehicle having the largest value obtained by subtracting the overall height from the overall length as the target vehicle. This is because the drag force received by the vehicle 1 is smaller as the overall height value is larger and the overall length value is shorter.

Furthermore, the vehicle 1 may obtain a traveling pattern of each of the plurality of surrounding vehicles (405) and determine the target vehicle based on the traveling pattern (406). The drag force received by the vehicle 1 may change according to the traveling patterns of the surrounding vehicles in addition to the overall height and length of the surrounding vehicles. Operation 410 corresponds to an embodiment in which the target vehicle is determined according to the traveling pattern of the surrounding vehicle, which is described in more detail with reference to FIGS. 7 and 8.

Meanwhile, the vehicle 1 may determine the target vehicle based on the traveling pattern together with the overall length and/or overall height of the surrounding vehicles. For example, the vehicle 1 may determine the target vehicle based on the traveling pattern as the second priority when two surrounding vehicles having the same overall length and/or overall height among the plurality of surrounding vehicles exist.

As described above, an embodiment of the disclosure may determine the target vehicle based on the traveling pattern in addition to the overall length and overall height of the surrounding vehicle. The flowchart shown in FIG. 7 corresponds to a process of specifying operation 410 of FIG. 5.

Figure 7:
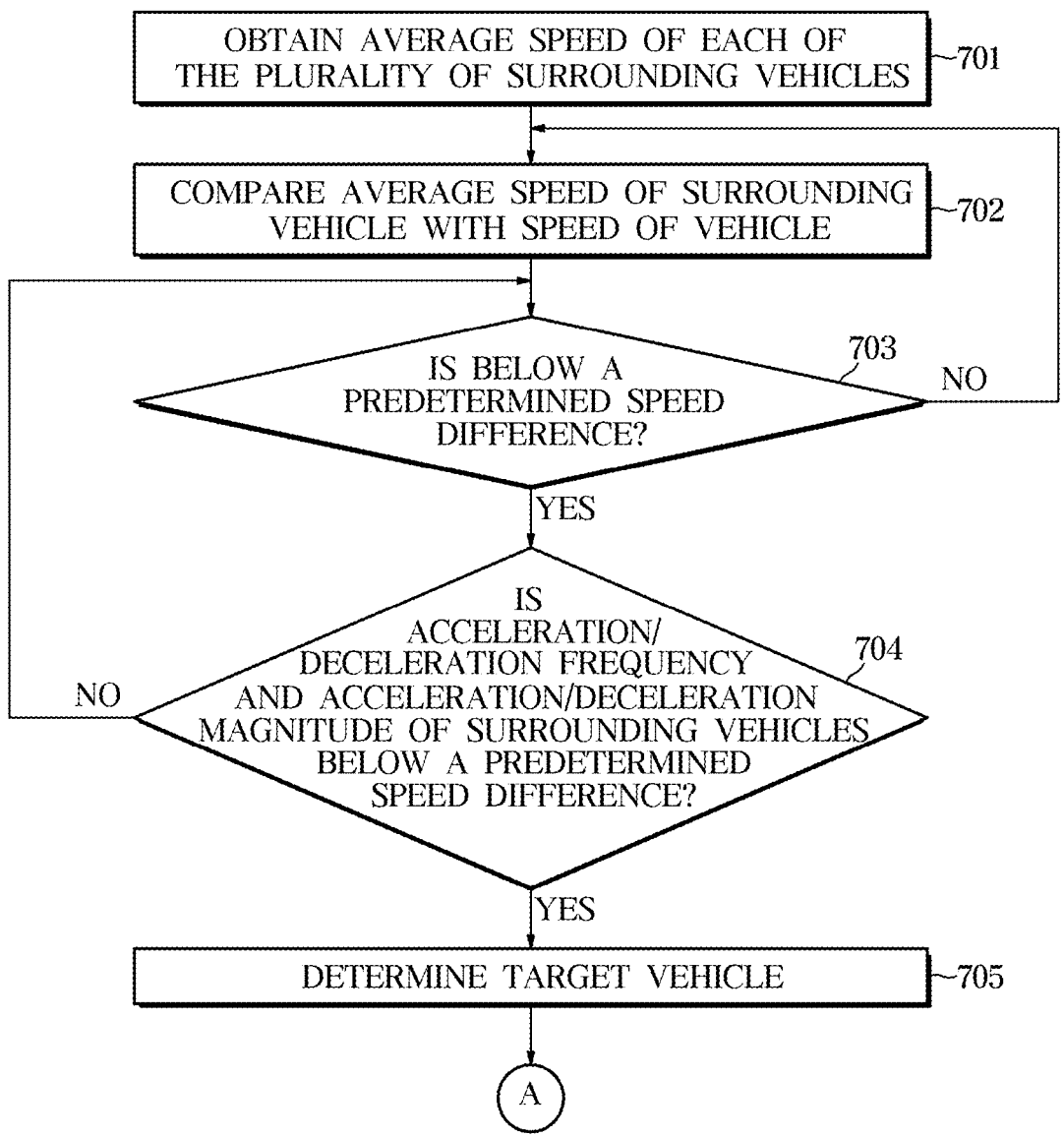
FIG. 7 is a flowchart illustrating a method for controlling a vehicle according to another embodiment of the disclosure.

FIGS. 7 and 8, the controller 140 obtains an average speed of each of the plurality of surrounding vehicles (701).

The controller 140 may compare the average speeds of the surrounding vehicles with the speed of the vehicle 1 (702) and determine the surrounding vehicle in which a speed difference between the average speed of the surrounding vehicle and the speed of the vehicle 1 is less than or equal to a predetermined speed difference, as the target vehicle or as a preliminary target vehicle. Herein, the speed of the vehicle 1 may be a set speed determined according to the setting of the autonomous driving mode or the current speed of the vehicle 1. The preliminary target vehicle corresponds to a candidate vehicle to perform an additional step when the surrounding vehicle is plural and when the surrounding vehicle satisfying the condition of operation 703 is plural.

When detecting the plurality of surrounding vehicles without the above-described additional step, the controller 140 compares the average speed of each of the plurality of surrounding vehicles with the speed of the vehicle and, as a result of the comparison, determines the surrounding vehicle in which a speed difference between the average speed of each of the plurality of surrounding vehicles and the set speed is less than or equal to a predetermined speed difference as the target vehicle.

In response to that the plurality of preliminary target vehicles are determined, the controller 140 may determine, as a final target vehicle, the surrounding vehicle with an acceleration/deceleration frequency and an acceleration/deceleration magnitude of the surrounding vehicle being less than or equal to a predetermined value (704 and 705). The controller 140 may determine the target vehicle in consideration of both the acceleration/deceleration frequency and the acceleration/deceleration magnitude but may determine the target vehicle in consideration of only one of the acceleration/deceleration frequency and the acceleration/deceleration magnitude.

Figure 8A:
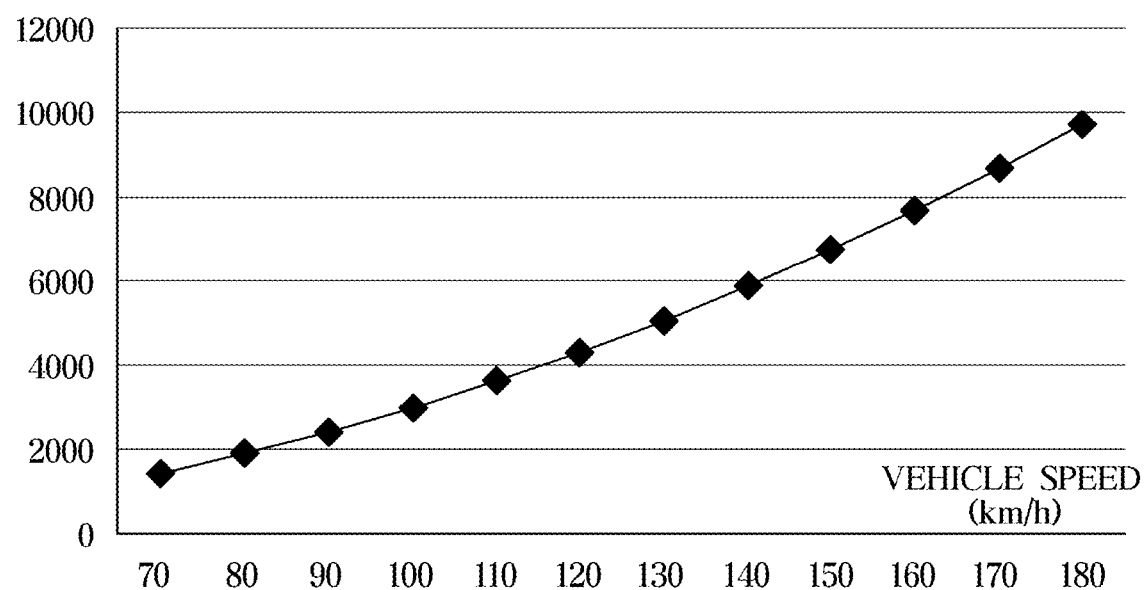
FIGS. 8A and 8B are a view for reference in description of the embodiment according to FIG. 7.

Referring to FIG. 8A, the more the speed increases, the more the air resistance received by the vehicle increases. Mathematically, the air resistance received by a moving object is proportional to the square of its velocity. Therefore, the set speed of the vehicle 1 is about 90% appropriate with respect to the speed limit of the road on which the vehicle is traveling (it may have a different value depending on the setting), and when the target vehicle is determined to be the surrounding vehicle having no significant difference from the set speed of the vehicle 1, drag force may be minimized.

Figure 8B:
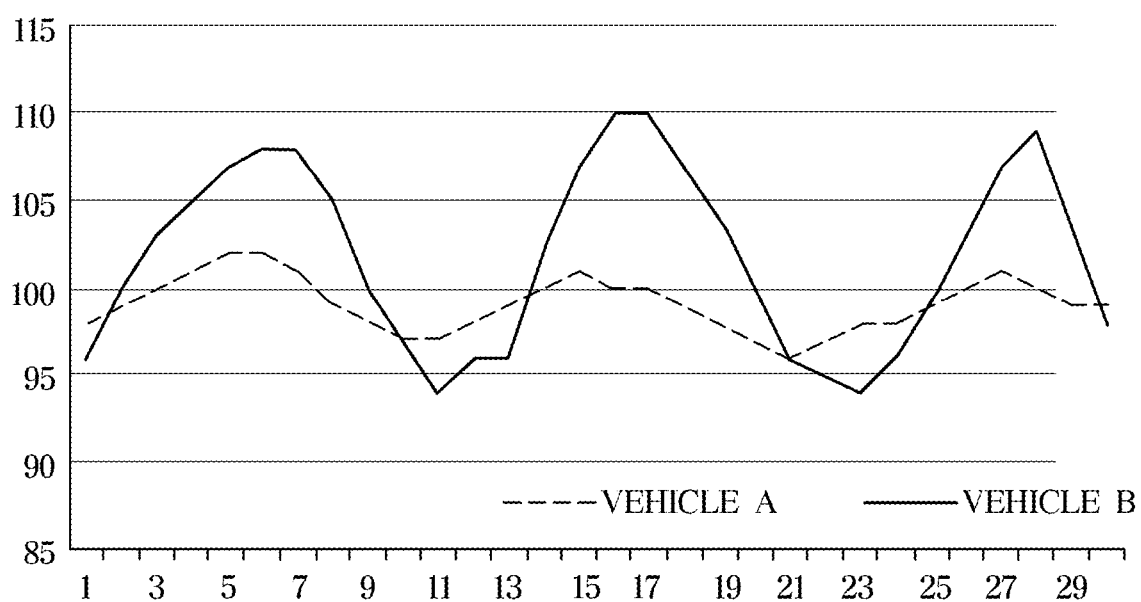

Furthermore, referring to FIG. 8B, it is advantageous for energy consumption efficiency to follow vehicle A having a smaller acceleration/deceleration magnitude among vehicles A and B. Vehicles A and B have the same average speed, but they will eventually have different energy consumption efficiencies according to the acceleration/deceleration magnitude.

In the above, the process of selecting the target vehicle to be followed by the vehicle 1 has been described. When the target vehicle is selected, the vehicle 1 performs an acceleration control, a deceleration control, and/or a steering control to follow the target vehicle. According to aerodynamics, the vehicle 1 may receive a small drag force when traveling in rear-end of the target vehicle, but this has a risk of not securing a safe distance. Accordingly, the vehicle is necessary to travel according to a position having a small drag force of around the target vehicle rather than rear-end thereof. A control method related thereto is described with reference to FIGS. 9-11.

Figure 9:
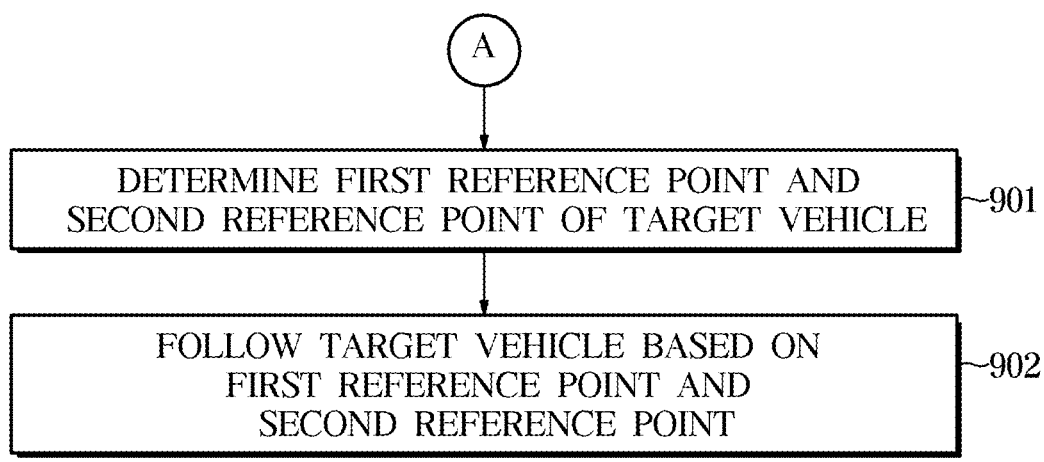
FIG. 9 is a flowchart illustrating a control method after a vehicle according to an embodiment of the disclosure determines a target vehicle.
Figure 10:
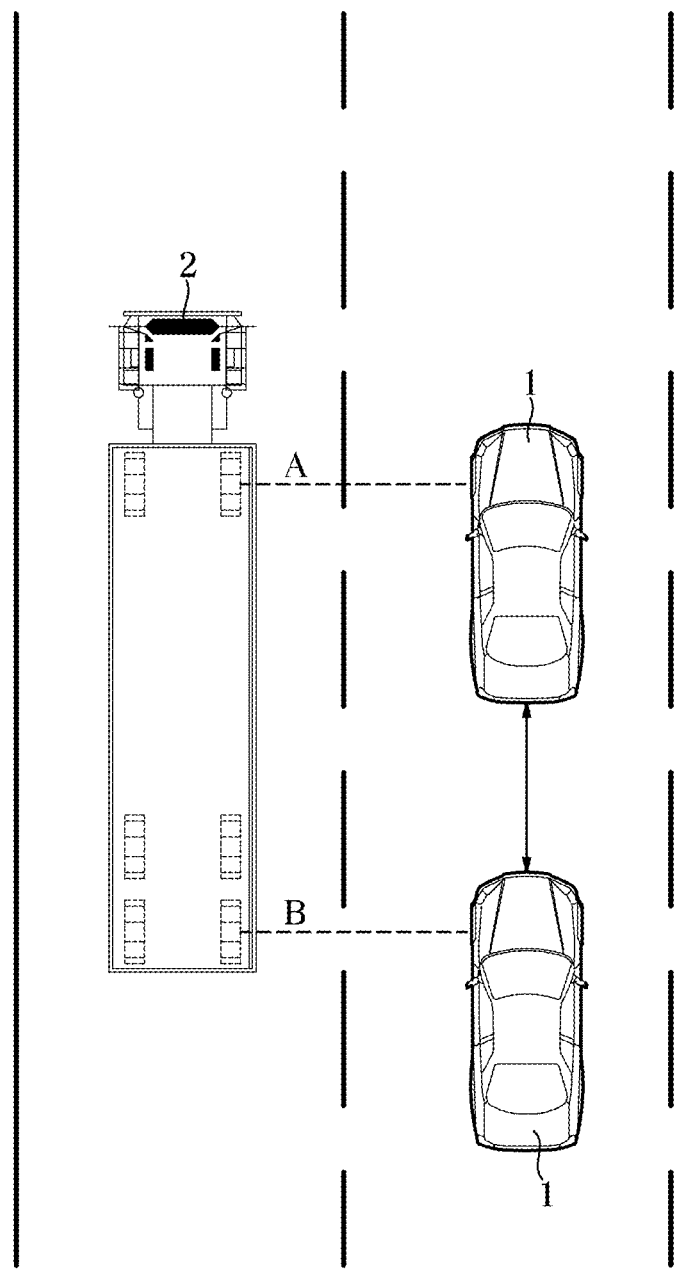
FIG. 10 is a view for reference in description of the embodiment according to FIG. 9.

FIG. 9 is a flowchart illustrating a control method after a vehicle according to an embodiment of the disclosure determines a target vehicle, and FIG. 10 is a view for reference in the description of the embodiment according to FIG. 9.

The controller 140 determines a first reference point and a second reference point of the target vehicle (901). The first reference point and the second reference point correspond to longitudinal positions of the vehicle 1 with respect to the target vehicle for minimizing drag force received by the vehicle 1 by the target vehicle. In the embodiment, the vehicle 1 is controlled to be driven in a lane adjacent to the target vehicle rather than following rear-end of the target vehicle.

Figure 11:
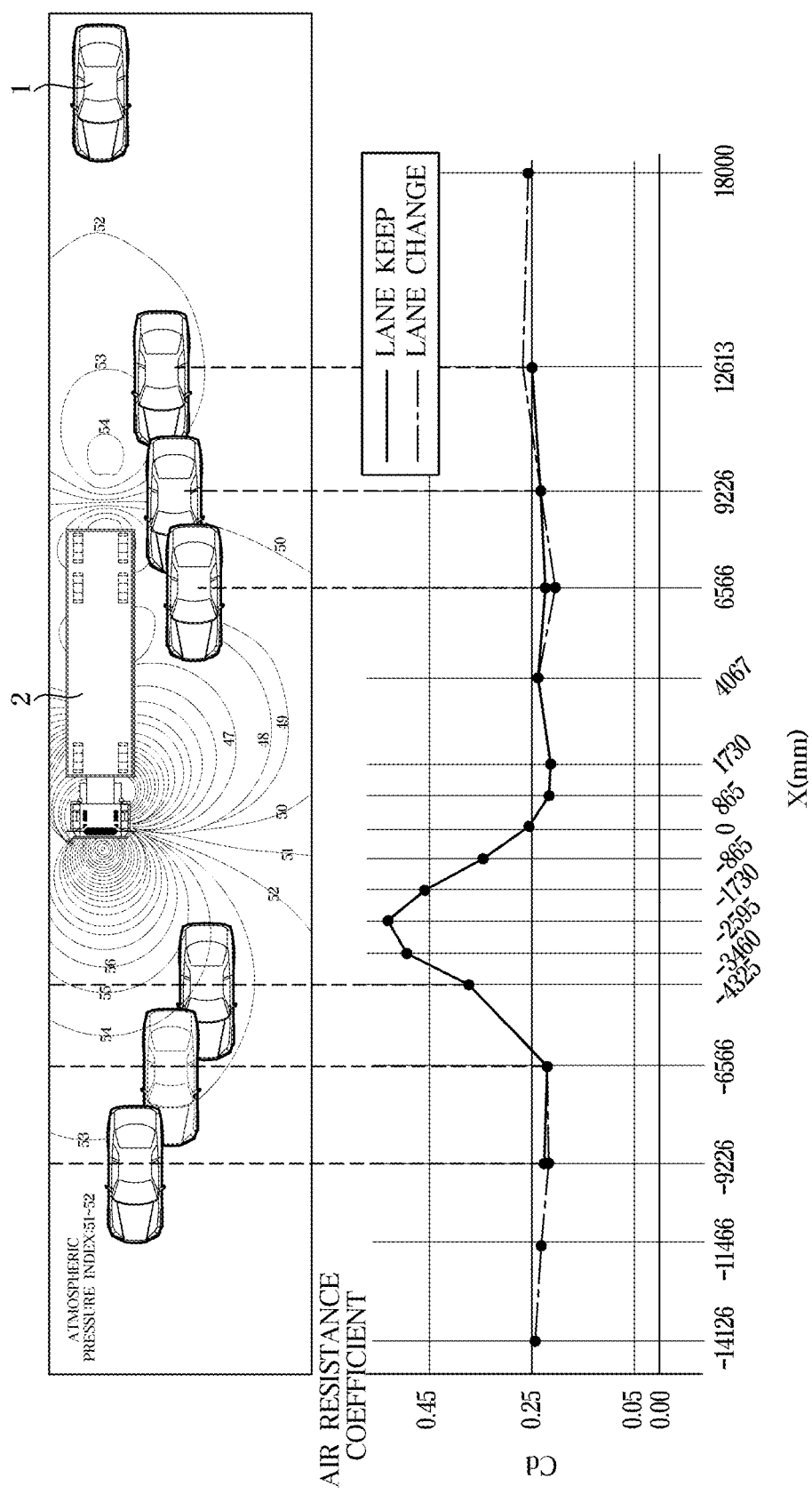
FIG. 11 is a view for explaining a difference in drag according to a relative position between a vehicle and a target vehicle.

Referring first to FIG. 11, the drag force applied to the vehicle 1 is not significantly different from that when traveling in the same lane as the target vehicle 2 and when traveling in a different lane. For example, in FIG. 11, when the vehicle 1 is located on the left side with respect to the target vehicle 2 (X=6566 mm), when the vehicle 1 is located on the rear left side with respect to the target vehicle 2 (X=9226 mm), and when the vehicle 1 is located on the rear side with respect to the target vehicle 2 (X=12613 mm), the differences in the drag force received by the vehicle 1 is small. Accordingly, in the embodiment, to secure a safe distance and improve energy consumption efficiency, the following control is performed in order to follow the side of the target vehicle 2 in a lane adjacent to the target vehicle 2.

For example, referring to FIG. 10, the first reference point A may be a front wheel of the target vehicle 2, and the second reference point B may be a rear wheel of the target vehicle 2. Furthermore, the first reference point A may be set based on a front side of the target vehicle 2, and the second reference point B may be set based on a rear side of the target vehicle 2. Furthermore, the first reference point A may be set based on the front wheel of the target vehicle 2 and the second reference point B may be set based on the rear side of the target vehicle 2, or the first reference point A may be set based on the front side of the target vehicle 2 and the second reference point B may be set based on the rear wheel of the target vehicle 2. As such, the reference points may be determined according to the shapes according to the overall height and overall length of the target vehicle 2. The memory 142 may store data related to drag force according to the location for each specification of the target vehicle 2, and the controller 140 may identify the specification of the target vehicle 2, and according to the specification, the first reference point and the second reference point may be determined.

Meanwhile, the reference points of the vehicle 1 synchronized with the first reference point and the second reference point may be set as a position of the front side of the vehicle 1 or a center of gravity of the vehicle 1.

The controller 140 follows the target vehicle 2 based on the first reference point and the second reference point (902). The controller 140 according to an embodiment of the disclosure may control the vehicle 1 to follow the target vehicle 2 between the first reference point A and the second reference point B in a lane adjacent to the lane on which the target vehicle 2 is traveling. The vehicle 1 may follow the target vehicle 2 in a state in which the reference point of the vehicle 1 coincides with the first reference point or the second reference point. The criterion for determining the first reference point or the second reference point may be changed according to various conditions of the road on which the vehicle is traveling.

As is apparent from the above, embodiments of the disclosure may provide a vehicle capable of improving energy consumption efficiency (fuel efficiency or energy efficiency) by minimizing air resistance caused by surrounding vehicles.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle, comprising:
   a camera installed in the vehicle and configured to have an external field of view of the vehicle and obtain image data; and
   a controller including a processor configured to process the image data;
   wherein the controller is further configured to:
   determine a target vehicle from at least one surrounding vehicle by processing the image data,
   determine a first reference point and a second reference point based on the target vehicle, and
   control the vehicle to follow the target vehicle between the first reference point and the second reference point in a lane adjacent to a lane on which the target vehicle is traveling.

2. The vehicle of claim 1, wherein the controller is further configured to:
   determine a front side or a front wheel of the target vehicle as the first reference point and determine a rear side or a rear wheel of the target vehicle as the second reference point.

3. The vehicle of claim 1, wherein the controller is further configured to:
   when a plurality of surrounding vehicles is detected, obtain overall heights of the plurality of surrounding vehicles, and determine a surrounding vehicle with a highest overall height among the plurality of surrounding vehicles as the target vehicle.

4. The vehicle of claim 1, wherein the controller is further configured to:
   when a plurality of surrounding vehicles is detected, obtain overall lengths of the plurality of surrounding vehicles, and determine a surrounding vehicle with a shortest overall length among the plurality of surrounding vehicles as the target vehicle.

5. The vehicle of claim 1, wherein the controller is further configured to:
   when a plurality of surrounding vehicles is detected, obtain overall lengths and overall heights of the plurality of surrounding vehicles, and determine a surrounding vehicle with a largest difference between the overall height and the overall length among the plurality of surrounding vehicles as the target vehicle.

6. The vehicle of claim 1, wherein the controller is further configured to:
   when a plurality of surrounding vehicles is detected, compare an average speed of each of the plurality of surrounding vehicles with a set speed of the vehicle, and as a result of the comparison, determine the target vehicle among the plurality of surrounding vehicles in which a difference between the average speed and the set speed is less than or equal to a predetermined speed difference.

7. The vehicle of claim 1, wherein the controller is further configured to:
   when a plurality of surrounding vehicles is detected, obtain an acceleration/deceleration frequency of each of the plurality of surrounding vehicles, and determine a surrounding vehicle with a smallest acceleration/deceleration frequency as the target vehicle.

8. The vehicle of claim 1, wherein the controller is further configured to:
   when a plurality of surrounding vehicles is detected, obtain an acceleration/deceleration magnitude of each of the plurality of surrounding vehicles, and determine a surrounding vehicle with a smallest acceleration/deceleration magnitude as the target vehicle.

9. The vehicle of claim 1, wherein the controller is further configured to:
   determine the target vehicle from the at least one surrounding vehicle in response to a user input signal for an autonomous driving mode.

10. A method of controlling a vehicle, the method comprising:
    obtaining image data;
    determining a target vehicle from at least one surrounding vehicle by processing the image data;
    determining a first reference point and a second reference point based on the target vehicle; and
    controlling the vehicle to follow the target vehicle between the first reference point and the second reference point in a lane adjacent to a lane on which the target vehicle is traveling.

11. The method of claim 10, wherein controlling the vehicle further comprises:
    determining a front side or a front wheel of the target vehicle as the first reference point and determining a rear side or a rear wheel of the target vehicle as the second reference point.

12. The method of claim 10, further comprising:
    when a plurality of surrounding vehicles is detected, obtaining overall heights of the plurality of surrounding vehicles, and determining a surrounding vehicle with a highest overall height among the plurality of surrounding vehicles as the target vehicle.

13. The method of claim 10, further comprising:
    when a plurality of surrounding vehicles is detected, obtaining overall lengths of the plurality of surrounding vehicles, and determining a surrounding vehicle with a shortest overall length among the plurality of surrounding vehicles as the target vehicle.

14. The method of claim 10, further comprising:
    when a plurality of surrounding vehicles is detected, obtaining overall lengths and overall heights of the plurality of surrounding vehicles, and determining a surrounding vehicle with a largest difference between the overall height and the overall length among the plurality of surrounding vehicles as the target vehicle.

15. The method of claim 10, further comprising:
    when a plurality of surrounding vehicles is detected, comparing an average speed of each of the plurality of surrounding vehicles with a set speed of the vehicle, and as a result of the comparison, determining the target vehicle among the plurality of surrounding vehicles in which a difference between the average speed and the set speed is less than or equal to a predetermined speed difference.

16. The method of claim 10, further comprising:
when a plurality of surrounding vehicles is detected, obtaining an acceleration/deceleration frequency of each of the plurality of surrounding vehicles, and determining a surrounding vehicle with a smallest acceleration/deceleration frequency as the target vehicle.

17. The method of claim 10, further comprising:
when a plurality of surrounding vehicles is detected, obtaining an acceleration/deceleration magnitude of each of the plurality of surrounding vehicles, and determining a surrounding vehicle with a smallest acceleration/deceleration magnitude as the target vehicle.

18. The method of claim 10, further comprising:
determining the target vehicle from the at least one surrounding vehicle in response to a user input signal for an autonomous driving mode.

19. A vehicle, comprising:

a camera installed in the vehicle and configured to have an external field of view of the vehicle and obtain image data; and a controller including a processor configured to process the image data;

wherein the controller is further configured to:

determine a target vehicle from at least one surrounding vehicle by processing the image data, determine a first reference point and a second reference point based on the target vehicle, control the vehicle to follow the target vehicle based on the first reference point and the second reference point, and when a plurality of surrounding vehicles is detected, obtain overall lengths of the plurality of surrounding vehicles, and determine a surrounding vehicle with a shortest overall length among the plurality of surrounding vehicles as the target vehicle.

* * * * *